(No Model.)
F. SHUMAN.
PROCESS OF EMBEDDING WIRE NETTING IN GLASS.
No. 483,021. Patented Sept. 20, 1892.
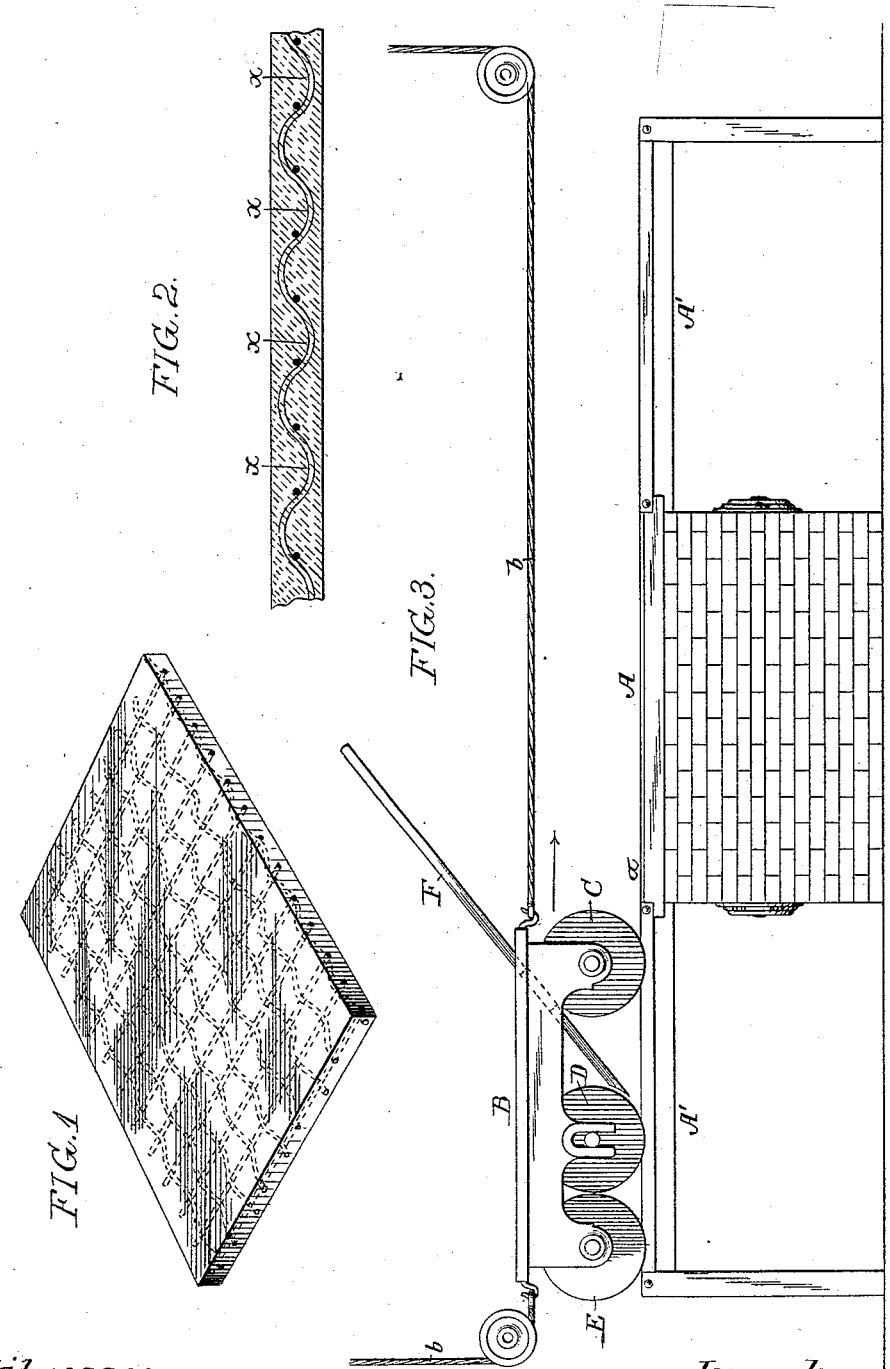
Witnesses:
P. O. Goodwin
R. Schleicher
Inventor:
Frank Shuman
by his Attorneys
Howson & Howson

UNITED STATES PATENT OFFICE.

FRANK SHUMAN, OF PHILADELPHIA, PENNSYLVANIA.

PROCESS OF EMBEDDING WIRE-NETTING IN GLASS.

SPECIFICATION forming part of Letters Patent No. 483,021, dated September 20, 1892.

Application filed July 6, 1892. Serial No. 439,147. (No specimens.)

*To all whom it may concern:*

Be it known that I, FRANK SHUMAN, a citizen of the United States, and a resident of Philadelphia, Pennsylvania, have invented an Improved Process of Embedding Wire-Netting in Glass, of which the following is a specification.

The object of my invention is to make what I term "wire-glass"—that is, glass having embedded within it wire or wire-netting—my present application relating to the process by which the glass is made.

In the accompanying drawings, Figure 1 is a perspective view of a sheet of wire-glass made in accordance with my invention. Fig. 2 is a longitudinal sectional view of the sheet of glass. Fig. 3 is a side view illustrating sufficient of a machine that I may use in carrying out my process.

Sheet-glass having wire or wire-gauze embedded in it is especially applicable for use in skylights, conservatories, vaults, and floor-lights—in fact, in places where strength is required or where the sash is in such position that if the glass should break it would be liable to injure persons passing. For instance, if the glass is used in skylights in railway-depots or train-sheds the wire embedded in the glass would prevent particles of glass from falling if it should crack, and at the same time the glass protects the wire-netting from the action of gases, which corrode the wire.

An application for patent for the article and an application for patent for a machine for carrying out this process have been filed of even date herewith.

In order to more clearly describe my process, I will refer to Fig. 3 of the drawings, which illustrates a machine by which my process may be carried out. A is the table for the reception of the molten glass, and under this table is a suitable furnace for heating the table to the proper temperature. On each side of the table are rails A'. B is a carriage having three rolls C, D, and E, the rolls C and E supporting the carriage in the present instance, while the roll D is so mounted that it can move vertically within its bearings. The rolls C and D are plain rolls, while the roll D has a series of annular ribs, which act to press the wire or wire-gauze into the molten glass. Directly in front of the roller D is an inclined chute F, upon which is placed the wire or wire-gauze. Each roller is hollow and is provided with a movable head, and adapted to each roller is a core, which can be heated to the proper temperature and placed within its roller. A rope or chain $b$ is provided in the present instance to draw the carriage across the table.

In carrying out my process I pour sufficient molten glass upon the table at the point $a$. The carriage then is moved in the direction of its arrow, and the roller C smooths out the molten glass to the proper thickness, after which the wire or wire-gauze is placed upon the molten glass and pressed into it by the roller D. The roller E follows the roller D and closes the opening made by the wire and the roller D. By this means a sheet of glass is rolled having embedded within it strips of wire or a sheet of wire-gauze. By forming a series of annular ribs upon the roller D at certain distances apart I am enabled to corrugate the wire, as shown in Figs. 1 and 2, the ribs making depressions in the wire at the points $x$, Fig. 2, and as the wire is pliable, owing to its being heated, it will yield at the points where pressed. Thus I am enabled to practically weave within the glass the wire in such manner as to tie both faces of the glass together. The rollers, instead of being mounted on a single carriage, as shown, may be mounted separately, and the glass may travel under stationary rollers, or other means of pressing the glass may be used without departing from my invention. It will be understood that the glass after it has been finished is placed in an annealing-furnace of the usual construction. The wire embedded in the glass not only strengthens the glass, but also prevents the particles of glass from breaking entirely away from the main sheet, and the glass protects the wire, preventing it from rusting.

I claim as my invention—

1. The process herein described of making wire-glass, said process consisting in, first, preparing a sheet of molten glass; second, mounting thereon wire or wire-gauze; third, pressing the said wire or wire-gauze into the glass, and, finally, closing the openings made by the wire, substantially as described.

2. The process herein described of making wire-glass, said process consisting in, first, rolling the glass into a sheet; second, placing upon the glass the wire or wire-gauze, impressing portions of the wire-gauze deeply into the glass, thus corrugating the same, and, finally, rolling the glass and embedding the wire therein, substantially as described.

In testimony whereof I have signed my name to this specification in the presence of two subscribing witnesses.

FRANK SHUMAN.

Witnesses:
H. F. REARDON,
HENRY HOWSON.